United States Patent

[11] 3,625,199

[72] Inventor George D. Summers
 Bethesda, Md.
[21] Appl. No. 874,467
[22] Filed Nov. 6, 1969
[45] Patented Dec. 7, 1971
[73] Assignee Fairchild Hiller Corporation
 Montgomery County, Md.

[54] IMPLANTABLE PRESSURE INDICATOR
 13 Claims, 6 Drawing Figs.
[52] U.S. Cl. .................................................. 128/2 R,
 128/2.05 D, 128/2.05 E
[51] Int. Cl. .................................................... A61b 05/02
[50] Field of Search ............................................ 128/2.05 D,
 2.05 E, 350, 349 B, 349 BV; 73/388, 402

[56] References Cited
 UNITED STATES PATENTS
| | | | |
|---|---|---|---|
| 2,634,721 | 4/1953 | Greenwood, Jr. ............. | 128/2.05 |
| 3,111,125 | 11/1963 | Schulte ......................... | 128/350 |
| 3,124,132 | 3/1964 | Sullivan et al. ............... | 128/2.05 |
| 3,240,207 | 3/1966 | Barker et al. .................. | 128/334 X |

*Primary Examiner*—Hugh R. Chamblee
*Attorney*—Michael W. York

ABSTRACT: An implantable pressure indicator for detecting and indicating abnormal body fluid pressures in a body cavity or canal including a fluid conduit adapted to be connected to the body cavity or canal containing the body fluid whose pressure is to be measured and a distensible member associated with the fluid conduit. The distensible member can consist of a tubular sleeve, an elastic disc, or a longitudinally expandable bellows.

PATENTED DEC 7 1971 3,625,199

INVENTOR
GEORGE D. SUMMERS

BY Michael W. York

ATTORNEY

IMPLANTABLE PRESSURE INDICATOR

This invention relates to an implantable pressure-indicative apparatus more particularly, this invention relates to an artificial apparatus which, when surgically implanted, permits a condition of higher than normal pressure to be determined through the intact skin by finger palpation, visual observation or through the use of external instrumentation.

The abnormal increase in the pressure of certain body fluids can indicate that a serious condition exists within the body and in some cases the continued presence of these body fluids under pressure can result in serious consequences to the body. An increase in pressure of the cerebrospinal fluid that is present with hydrocepholus can lead to brain damage or death. In a similar manner, an increase in urine pressure can indicate that the sphincter muscle is malfunctioning and the continued presence of urine under abnormal pressure can lead to bladder and kidney problems. In view of the serious consequences that can result from an increase in the pressure of various body fluids, it is important to detect the abnormal increase in body fluid pressure.

Unfortunately, present methods of obtaining fluid pressure within the body are often difficult, expensive, painful, or can result in infection or other hazards. For example, pressure of the cerebrospinal fluid is most frequently obtained by means of a spinal tap which is a puncture of the covering of the spinal cord in the lumbar area that can be dangerous. Pressure of the urinary bladder can be obtained via a catheter through the urethra which may lead to infection and is uncomfortable or by precutaneous penetration of the bladder wall.

The present invention overcomes the difficulties associated with previous systems and permits the effective detection and indication of abnormal increases in the pressure of body fluids.

It is therefore an object of the present invention to provide an implantable apparatus for detecting and indicating the abnormal increase in pressure of body fluids.

Another object of the present invention is to provide an implantable apparatus for monitoring excessive intracorporeal fluid pressure through the intact skin of the body.

Another object of this invention is to provide an implantable apparatus that can be used to remove body fluids.

The present invention provides an implantable apparatus for detecting and indicating the presence of abnormally high body fluid pressures within a body cavity or canal that includes a fluid conduit that is adapted to be connected to the body cavity or canal for receiving body fluid from the body cavity or canal and a distensible member associated with the fluid conduit for receiving body fluid that is transmitted from the body cavity or canal through the fluid conduit. In order that the invention may be more clearly set forth and better understood, reference is made to the accompanying drawings in which:

Figure 1:
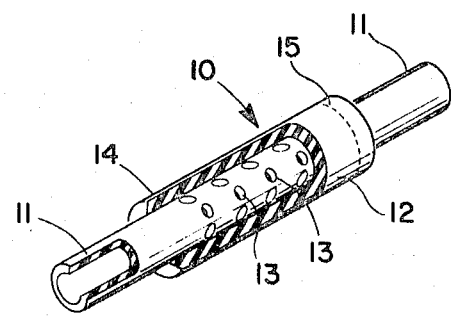
FIG. 1 is a perspective view partly in section of the implantable body fluid pressure indicator of this invention when subjected to normal body fluid pressure.
Figure 2:
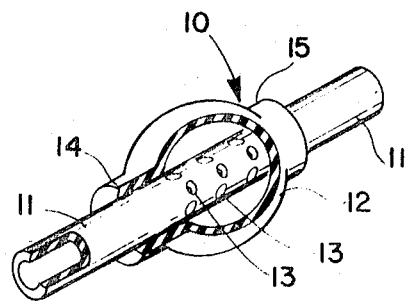
FIG. 2 is a perspective view partly in section of the body fluid pressure indicator shown in FIG. 1 when subjected to abnormally high body fluid pressure.
Figure 5:
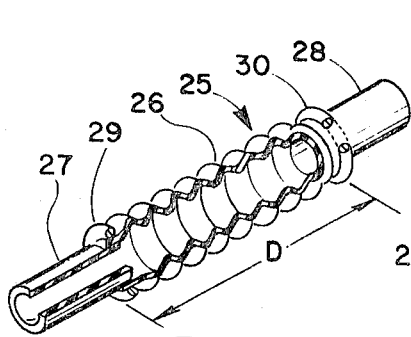
Figure 6:
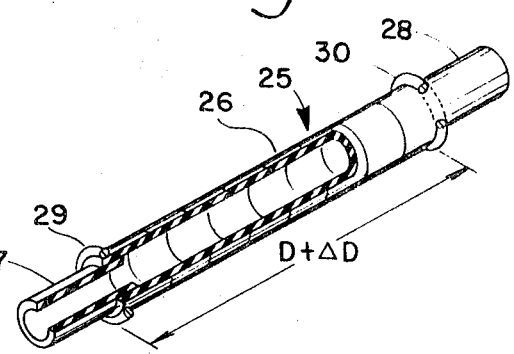

FIG. 5 is a perspective view partly in section of an additional embodiment of the implantable body fluid pressure indicator of the invention when subjected to normal body fluid pressure; and FIG. 6 is a perspective view partly in section of the body fluid pressure indicator shown in FIG. 5 when subjected to abnormally high body fluid pressure. Referring first to FIGS. 1 and 2 there is shown the implantable body fluid pressure indicator 10 of this invention. The implantable body fluid pressure indicator 10 comprises a nonmetallic tubular fluid conduit 11 that is adapted to be connected to a body cavity or canal for receiving body fluid from the body cavity or canal and a distensible member comprising an elastic tubular sleeve 12 that fits around the tubular fluid conduit. The tubular fluid conduit 11 has holes 13 that extend through its wall that are located near the central portion of the fluid conduit for permitting fluid to pass through the conduit walls. The end sections 14 and 15 of the distensible tubular sleeve 12 are connected to the fluid conduit 11 to form a fluidtight seal at locations that are outside of the central portion of the fluid conduit that has the holes 13. The remaining portions of the elastic tubular sleeve 12 are not connected to the fluid conduit 11 and thus the central portion of the tubular sleeve located adjacent to the holes 13 is free to expand as illustrated in FIG. 2 and receive body fluid that is transmitted from the body cavity or canal through the fluid conduit if abnormally high body fluid pressure forces body fluid through the holes 13. Since the fluid pressure that is exerted against the elastic tubular sleeve 12 is balanced by the forces developed in the elastic tubular sleeve as it expands, these forces will cause the elastic tubular sleeve to resume its normal state illustrated in FIG. 1 when the body fluid pressure returns to its normal level.

Figure 3:
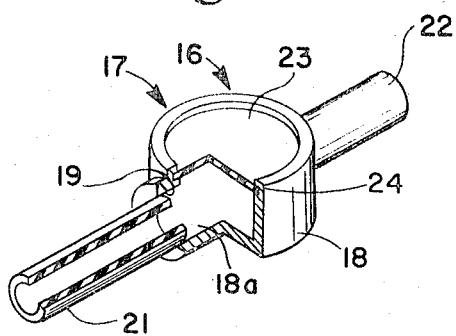
FIG. 3 is a perspective view partly in section of an alternative embodiment of the implantable body fluid pressure indicator of this invention when subjected to normal body fluid pressure.
Figure 4:
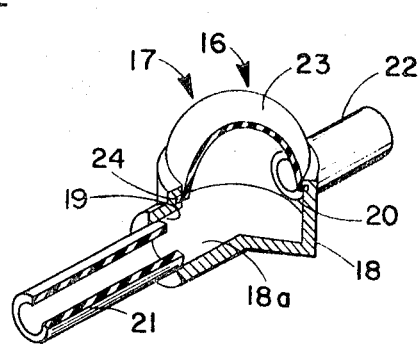
FIG. 4 is a perspective view partly in section of the body fluid pressure indicator shown in FIG. 3 when subjected to abnormally high body fluid pressure.

An alternative implantable body fluid pressure indicator 16 is illustrated in FIGS. 3 and 4. The pressure indicator 16 has a distensible member 17 that comprises a cylindrical container 18 that has a closed bottom 18a and openings 19 and 20 is its cylindrical wall for receiving nonmetallic tubular fluid conduits 21 and 22 and that are connected to the cylindrical container and are adapted to be connected to a body cavity or canal for receiving body fluid from the body cavity or canal. The member 17 that is connected to the fluid conduits 21 and 22 for receiving body fluid that is transmitted from the body cavity or canal through the fluid conduit also includes an elastic expandable membrane in the form of a disc 23 whose rim is attached to the rim 24 around the open end of the cylindrical container 18 so that the opening of the cylindrical container is covered by the elastic membrane disc. When body fluid under normal pressure is located in or is flowing through the tubular conduits 21 and 22 and the cylindrical container 18, the elastic expandable disc 23 lays flat across the top of the cylindrical container as illustrated in FIG. 3. However, when body fluid that is under abnormally high pressure is located in or is flowing through the tubular conduits 21 and 22 and the cylindrical container 18, the expandable disc 23 bulges out as indicated in FIG. 4. Since the expandable disc 23 is elastic the amount of bulging or deformation will increase as the body fluid pressure increases above its normal value and decreases as the body fluid pressure approaches its normal value.

In FIGS. 5 and 6 an additional body fluid pressure indicator 25 is shown that includes a distensible member that comprises a hollow elastic bellows 26 that can expand and contract lengthwise. Tubular conduits 27 and 28 that are adapted to be connected to a body cavity or canal for receiving body fluid from the body cavity or canal are connected to the ends of the hollow elastic longitudinally expandable bellows 26 so that the expandable bellows receives body fluid that is transmitted from the body cavity or canal through the fluid conduits. Magnetically permeable rings 29 and 30 are located around and connected to the ends of the elastic bellows 26 for permitting the distance between the permeable rings to be measured and thus the amount of expansion of the bellows from outside the body after the body fluid pressure indicator has been implanted within the body. When a body fluid under normal pressure is located in or is flowing through the tubular conduits 27 and 28 and the hollow elastic bellows 26 the bellows remains collapsed as illustrated in FIG. 5 and the distance between the permeable rings 28 and 30 is a fixed distance D. When a body fluid under abnormally high pressure is flowing through or is located in the tubular conduits 27 and 28 and the elastic bellows 26, the bellows expands lengthwise so that the distance between the magnetically permeable rings 29 and 30 is D+$\Delta$D where the distance $\Delta$D is due to the increase in body fluid pressure. Since ΔD varies in relation to the pressure within the elastic bellows 26 and since the magnetically permeable rings 29 and 30 permit ΔD to be measured by suitable equipment (not shown) located outside the body, the presence of abnormally high body pressure within the bellows can be readily detected and measured from outside the body after the pressure indicator 25 has been implanted.

The types of materials that are used for the pressure indicator must be compatible with the body and body fluids. The conduits 11, 21, 22, 27 and 28 are preferably made of medical grade silicone rubber. The expandable elastic tubular member 12, the expandable membrane disc 23 and the elastic bellows 26 are preferably made from ultrapure latex rubber or a suitable elastic silicone rubber. The thickness of the elastic tubular member 12, the expandable disc 23 and the elastic bellows 26 will be dependent upon the type of material that is employed and the body fluid pressures that are likely to be encountered. These members should be thick enough that normal body fluid pressures do not cause them to be distorted but they should be distortable when subjected to abnormally high body fluid pressures. The cylindrical container of the embodiment shown in FIGS. 3 and 4 can be made from stainless steel, titanium, a polycarbonate resin or other body compatible materials.

In order to use the pressure indicators of this invention they are implanted at suitable locations within the body. To use the pressure indicator 10 illustrated in FIGS. 1 and 2, the ends of the fluid conduit 11 are connected by known surgical techniques to the body channel or cavity carrying the fluid whose pressure is to be measured. For best results, the pressure indicator 10 should be implanted close to the skin so that any enlargement of the expandable elastic tubular member 12 due to an abnormal increase in body fluid pressure can readily by detected through the skin by finger palpation or visual observation. In a similar manner, the free ends of the tubular conduits 21 and 22 of the pressure indicator 16 of FIGS. 3 and 4 are connected by known surgical techniques to the body channel or cavity carrying the fluid whose pressure is to be measured. Again the pressure indicator 16 should be implanted close to the skin and the pressure indicator should be implanted with the elastic disc 23 facing the shin so that any distortion of the disc that is due to an abnormal increase in body fluid pressure is readily detectable through the skin by visual observation or finger palpation. The pressure indicator 25 of FIGS 5 and 6 is also implanted in the body and connected to the body channel or cavity that carries the fluid whose pressure is to be measured by surgically connecting the tubular conduits 27 and 28 to the body channel or cavity. However the pressure indicator 25 need not be implanted close to the skin since the location of the permeable rings 29 and 30 can be detected through a considerable amount of body tissue by using suitable detection equipment located outside the body.

In an emergency abnormally high body fluid pressures can be relieved by using the implantable pressure indicators by inserting a hypodermic needle (not shown) through the skin and into the tubular member 12, the elastic disc 23, or the elastic bellows 26 and withdrawing the body fluid through the hypodermic needle. Also in some instances, it may be unnecessary to have the body fluid pass through the tubular fluid conduit 11, the member 17 or the bellows 26. In these cases one of the conduits or one end of the conduit in the case of the tubular conduit 11 can be sealed or closed and all that is necessary is to connect the other conduit 11 to the body cavity or channel so that the tubular conduit 11 and the surrounding tubular sleeve 12, the elastic disc 23, or the elastic bellows 26 is exposed to the body fluid.

Although the invention has been described in considerable detail with reference to certain preferred embodiments, it will be understood that variations and modifications may be made within the spirit and scope of the invention as defined in the appended claims.

What is claimed is:

1. A surgically implantable body fluid pressure indicating apparatus for indicating the presence of abnormally high body fluid pressure within a body cavity or canal comprising a nonmetallic implantable fluid conduit adapted to be surgically connected to the body cavity or canal to receive body fluid from the body cavity or canal, said nonmetallic implantable fluid conduit having holes through its walls for permitting fluid to pass therethrough, and an implantable distensible elastic tubular sleeve located around said nonmetallic implantable fluid conduit having its end sections connected to said nonmetallic implantable fluid conduit to form fluidtight seals, said implantable distensible elastic tubular sleeve having a central portion located adjacent to the holes of said implantable fluid conduit that is not connected to said nonmetallic implantable fluid conduit that is free to expand and receive body fluid that is transmitted from the body cavity or canal through said nonmetallic implantable fluid conduit if abnormally high body fluid pressure forces body fluid through the holes of said nonmetallic implantable fluid conduit.

2. A surgically implantable body fluid pressure indicating apparatus for indicating the presence of abnormally high body fluid pressure within a body cavity or canal comprising an implantable sealable container having an opening, at least one nonmetallic implantable fluid conduit connected in flaw communication to said implantable container and adapted to be surgically connected to the body cavity or canal for receiving body fluid from the body cavity or canal, and an elastic expandable membrane connected to said container and covering the opening of said container, said expandable membrane being adapted to bulge outward in response to body fluid under abnormally high pressure located in said implantable container.

3. The surgically implantable body fluid pressure indicating apparatus of claim 2 wherein said elastic expandable membrane comprises a disc.

4. The surgically implantable body fluid pressure indicating apparatus of claim 3 wherein said implantable container that has an opening comprises a cylinder having a closed end and an open end and wherein the opening of said container is the open end of said cylinder.

5. A surgically implantable body fluid pressure indicating apparatus for indicating the presence of abnormally high body fluid pressure within a body cavity or canal comprising an elastic hollow bellows, said elastic hollow bellows being expandable lengthwise in response to abnormally high pressure body fluid located in said bellows, at least one tubular conduit adapted to be connected to the body cavity or canal and connected in flow communication to one end of said elastic hollow bellows for receiving body fluid from the body cavity or canal, the other end of said bellows being sealable and means connected to opposite ends of said elastic hollow bellows for indicating the longitudinal expansion of said bellows.

6. The surgically implantable body fluid pressure indicating apparatus of claim 5 wherein said indicating means comprise magnetically permeable members.

7. The surgically implantable body fluid pressure indicating apparatus of claim 6 wherein said magnetically permeable members comprise a magnetically permeable ring disposed about each end of said bellows.

8. A surgically implantable body fluid pressure indicating apparatus for indicating the presence of abnormally high body fluid pressure within a body cavity or canal comprising an implantable container having an opening, at least two nonmetallic implantable fluid conduits connected in flow communication to said implantable container and being adapted to be surgically connected to the body cavity or canal, and an elastic expandable membrane connected to said container and covering the opening of said container, said expandable membrane being adapted to bulge outward in response to body fluid under abnormally high pressure located in said implantable container.

9. The surgically implantable body fluid pressure indicating apparatus of claim 8 wherein said elastic expandable membrane comprises a disc.

10. The surgically implantable body fluid pressure indicating apparatus of claim 9 wherein said implantable container that has an opening comprises a cylinder having a closed end and an open end and wherein the opening of said container is the open end of said cylinder.

11. A surgically implantable body fluid pressure indicating apparatus for indicating the presence of abnormally high body fluid pressure within a body cavity or canal comprising an elastic hollow bellows, said elastic hollow bellows being expandable lengthwise in response to abnormally high pressure body fluid located in said bellows, a first tubular conduit adapted to be connected to the body cavity or canal and connected in flow communication to one end of said elastic hollow bellows, a second tubular conduit adapted to be connected to the body cavity or canal and connected in flow communication to the opposite end of said elastic hollow bellows, and means connected to opposite ends of said elastic hollow bellows for indicating the longitudinal expansion of said bellows.

12. The surgically implantable body fluid pressure indicating apparatus of claim 11 wherein said indicating means comprise magnetically permeable members.

13. The surgically implantable body fluid pressure indicating apparatus of claim 12 wherein said magnetically permeable members comprise a magnetically permeable ring disposed about each end of said bellows.

* * * * *